(12) United States Patent
Sosa et al.

(10) Patent No.: US 8,093,332 B2
(45) Date of Patent: Jan. 10, 2012

(54) HIGH IMPACT POLYSTYRENE AND PROCESS FOR PREPARING SAME

(75) Inventors: Jose M. Sosa, Deer Park, TX (US); Billy J. Ellis, Spring, TX (US)

(73) Assignee: Fina Technology, Inc., Houston, TX (US)

( * ) Notice: Subject to any disclaimer, the term of this patent is extended or adjusted under 35 U.S.C. 154(b) by 1790 days.

(21) Appl. No.: 10/674,224

(22) Filed: Sep. 29, 2003

(65) Prior Publication Data

US 2005/0070662 A1   Mar. 31, 2005

(51) Int. Cl.
*C08G 63/48* (2006.01)
*C08G 63/91* (2006.01)
*C08L 51/00* (2006.01)
*C08F 2/00* (2006.01)
*C08F 4/04* (2006.01)
*C08F 4/32* (2006.01)
*C08F 4/38* (2006.01)
*C08F 281/00* (2006.01)

(52) U.S. Cl. ........... 525/64; 525/69; 525/263; 525/265; 525/273; 526/219.2; 526/228; 526/230.5; 526/232.5; 526/245

(58) Field of Classification Search ............ 525/64, 525/69, 263, 265, 273; 526/219.2, 228, 230.5, 526/232.5, 245
See application file for complete search history.

(56) References Cited

U.S. PATENT DOCUMENTS

| | | | |
|---|---|---|---|
| 3,538,191 A | 11/1970 | Meredith | |
| 4,000,220 A | 12/1976 | Shoji | |
| 4,125,695 A * | 11/1978 | Kamath | 526/73 |
| 4,777,210 A | 10/1988 | Sosa et al. | |
| 4,861,827 A * | 8/1989 | Sosa et al. | 525/54 |
| 5,428,106 A * | 6/1995 | Schrader et al. | 525/71 |
| 5,959,033 A | 9/1999 | Demirors et al. | |
| 6,350,813 B1 | 2/2002 | Schrader et al. | |
| 6,395,791 B1 | 5/2002 | Chaudhary et al. | |
| 6,441,099 B1 | 8/2002 | Connell et al. | |
| 6,503,992 B2 | 1/2003 | Mitchell et al. | |
| 6,569,941 B2 | 5/2003 | Sosa et al. | |
| 2002/0173588 A1 | 11/2002 | Sosa et al. | |

FOREIGN PATENT DOCUMENTS

| | | |
|---|---|---|
| CA | 1331820 | 8/1994 |
| CN | 1337419 A | 2/2002 |
| DE | 207107 | 2/1954 |
| JP | 60208314 | 10/1985 |

OTHER PUBLICATIONS

"Third of Serial Lectures on Multi-component Polymer System—Plastic Toughened with Rubber", Author: Jiang Ming, published on Dec. 31, 1983 in magazine "Rubber Industry", No. 8, 1983, pp. 36-42.

"Advanced Structure Analysis", Author: MA Lidun, Fudan University Press, Jul. 31, 2002, p. 436.

"Experiments on Macromolecule Science and Engineering", Author: OU Guorong, etc., Huadong Science and Engineering University Press, Mar. 31, 1998, pp. 24-26.

* cited by examiner

*Primary Examiner* — Nathan M Nutter

(57) ABSTRACT

Disclosed are high impact polystyrenes prepared using mixed initiators. The mixed initiators include at least one grafting initiator and one non-grafting initiator. The high impact polystyrenes prepared therewith have a continuous polystyrene phase and dispersed therein particles of rubber predominantly having a honeycomb structure of rubber with polystyrene inclusions.

21 Claims, 6 Drawing Sheets

HIGH IMPACT POLYSTYRENE AND PROCESS FOR PREPARING SAME

BACKGROUND OF THE INVENTION

1. Field of the Invention

The present invention relates to high impact polystyrene. The present invention particularly relates to high impact polystyrene prepared using a solution blend process.

2. Background of the Art

Polystyrene is one of the largest volume thermoplastic resins in commercial production today. Unmodified polystyrene is well suited to applications where its brittleness is acceptable. Engineering plastics have been used in applications where less brittleness is required, but such polymers are often expensive or have properties other than less brittleness that make them less than optimum selections. Thus, styrene-based copolymers, and particularly polystyrene resins that are modified with organic rubber particles, have been investigated for use in applications requiring less brittleness. The modification of polystyrene to reduce brittleness is often referred to increasing its impact properties and thus the modified polystyrene is said to have higher impact.

These high-impact polystyrene blends, commonly referred to by the acronym HIPS, are known to be useful in the art of preparing articles with polymers wherein the application for the articles requires less brittleness than unmodified polystyrene. For example, U.S. Defensive Publication T59,011 to Smith discloses that a high impact resin can be prepared by blending from 15 to 50 parts of an impact modifier with from 85 to 50 parts of a clear crystal polystyrene. Such materials are disclosed to be useful for packaging applications.

Another method of making HIPS is to first dissolve a rubber in styrene monomer and then polymerize the monomer. Such polymers are disclosed in U.S. Pat. No. 6,569,941 Sosa, et al. Therein, it is disclosed that styrene monomer containing a dissolved polybutadiene rubber is flowed into an elongated upflow stirred reactor containing three reaction zones, wherein the styrene monomer is polymerized to form a HIPS.

In HIPS, desirably the polystyrene is a continuous phase including a discontinuous phase of rubber particles. The size and distribution of the rubber particles in the continuous polystyrene phase can affect the properties of the HIPS.

SUMMARY OF THE INVENTION

In one aspect, the present invention is a process for preparing a high impact polystyrene, the process including admixing a rubber and styrene monomer in the presence of at least two polymerization initiators and polymerizing the styrene wherein at least one of the at least two polymerization initiators is a grafting initiator and at least one of the at least two polymerization initiators is a non-grafting initiator.

In another aspect, the present invention is high impact polystyrene prepared by a process for preparing a high impact polystyrene, the process including admixing a rubber and styrene monomer in the presence of at least two polymerization initiators and polymerizing the styrene wherein at least one of the at least two polymerization initiators is a grafting initiator and at least one of the at least two polymerization initiators is a non-grafting initiator.

BRIEF DESCRIPTION OF THE DRAWINGS

For a detailed understanding and better appreciation of the present invention, reference should be made to the following detailed description of the invention and the preferred embodiments, taken in conjunction with the accompanying drawings, wherein.

Figure 1:
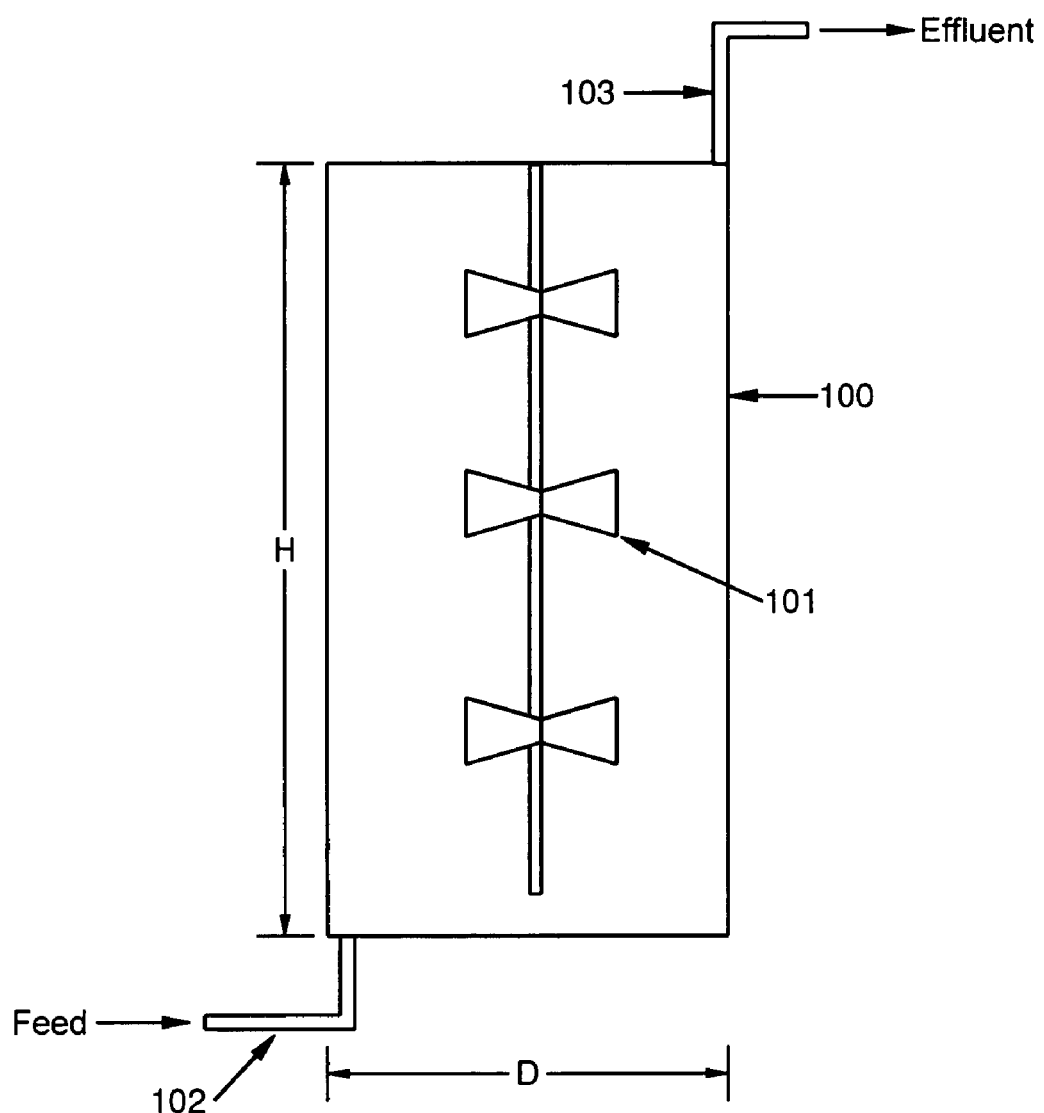
FIG. 1 is a schematic view of an elongated upflow reactor.

It will be appreciated that the figures are not necessarily to scale and the proportions of certain features are exaggerated to show detail.

DETAILED DESCRIPTION OF INVENTION

In the practice of the method of the present invention of preparing a high impact polystyrene, a rubber is dissolved in a styrene monomer. This process is a solution polymerization process. Rubbers useful with the method of the present invention include polybutadiene (PB), styrene-butadiene rubber (SBR), and styrene-butadiene-styrene rubber (SBS). Natural rubbers can also be used. Mixtures of these rubbers can be used.

The high impact polystyrene polymers of the present invention are prepared by admixing styrene and a rubber or mixture of rubbers. In a first embodiment of the present invention, the rubbers or mixture of rubbers is soluble in the styrene. In a second embodiment, a solvent can also be used to increase the solubility of the rubbers in the styrene monomer. Suitable solvents include aromatic solvents such as ethylbenzene, toluene, xylenes, cyclohexane, and aliphatic hydrocarbon solvents, such as dodecane, and mixtures thereof. Any solvent useful to facilitate the full or partial dissolution of rubber in styrene monomer that can be removed after polymerization of the styrene monomer and does not interfere with the polymerization of the styrene monomer can be used with the method of the present invention.

The admixture of monomer rubber or mixture of rubbers is further admixed with at least two polymerization initiators. At least one of these polymerization initiators is a grafting polymerization initiator. Exemplary grafting initiators include peroxide initiators such as, but not limited to Lupersol® 331 (1,1-di-(t-butylperoxy)cyclohexane); Lupersol® 531 (1,1-di-( t-amylperoxy)cyclohexane); Lupersol 231 (1,1-di-(t-butylperoxy)-3,3,5-trimethyl-cyclohexane); Lupersol TAEC (OO-t-amyl-O-(2-ethylbexyl monoperoxy-carbonate); Lupersol TBIC (OO-t-butyl O-isopropyl monoperoxy-carbonate); Lupersol TBEC (OO-t-butyl-O-(2-ethylhexyl) monoperoxy-carbonate); Trigono® 17 (N-butyl-4,4-di(t- butylperoxy)valerate); and Lupersol 233 (Ethyl 3,3-Di-(t-butylperoxy)butyrate). Other initiators that can be used with the method of the present invention include peroxides with one hour half-lives ranging from 60 to 150° C. from diacyl peroxides, diazo compounds, peroxydicarbonates, peroxyesters, dialkylperoxides, hydroperoxides, and perketals. Mixtures of these initiators can also be used.

In the practice of the process of the present invention, at least one of the initiators used to polymerize the styrene monomer of the styrene monomer and dissolved rubber admixture is a non-grafting initiator. Exemplary non-grafting initiators include 2,2'-azobis(isobutyronitrile) (AIBN), 2,2'-azobis(2-methylbutyronitrile) (AMBN), lauroyl peroxide, and decanoyl peroxide. Mixtures of these initiators can also be used.

The terms "grafting" and "non-grafting" used above relate to the ability of an initiator to promote a both the homopolymerization of styrene and the reaction of polymerizing styrene to react with residual unsaturation in the rubber. For the purposes of the present invention, a grafting polymerization initialization initiator is one that promotes both the initialization of styrene and the reaction of styrene or polystyrene with the residual unsaturation in a dissolved rubber. Similarly, for the purposes of the present invention, a non-grafting polymerization initialization initiator is one that promotes the initialization of styrene, but does not materially promote the reaction of styrene or polystyrene with the residual unsaturation in a dissolved rubber. While not wishing to be bound by any theory, it is believed that the use of the too much grafting polymer can cause the development of morphology which does not allow for optimum physical properties in the high impact polystyrene so made.

The polymerization of the styrene monomer can be done using any method known to be useful to those of ordinary skill in the art of preparing polystyrene blends. For example, the polystyrene blends can be prepared using an upflow reactor. The polymerization process can be either continuous or done in batches. The temperature ranges useful with process of the present invention can be selected to be consistent with the operational characteristics of the equipment used to perform the polymerization. In one embodiment, the temperature range for the polymerization can be from about 100° C. to about 230° C. In another embodiment, the temperature range for the polymerization can be from about 110° C. to about 180° C.

In the practice of the process of the present invention, the grafting and non-grafting polymerization initiators are present in amounts useful to promote the polymerization of the styrene monomer to produce a high impact polystyrene. In one embodiment, the grafting polymer is present in an amount of from about 50 to 1000 to about ppm while the non-grafting polymer is present in an amount of from about 100 to 600 to about ppm. In another embodiment, the grafting polymer is present in an amount of from about 100 to 600 to about ppm while the non-grating polymer is present in an amount of from about 100 to 500 to about ppm. In the embodiments of the present invention, the ratio of grafting to non-grafting initiator is from about 1:10 to about 10:1. In one specific embodiment, the ratio of grafting to non-grafting initiator is from about 1:3 to about 3:1.

In the HIPS polymers of the present invention, the weight ratio of polystyrene to rubber, PS:RUBBER, is from about 99:1 to about 7:1. In another embodiment, the weight ratio of polystyrene to rubber, PS:RUBBER, can be from about 19:1 to about 10:1. Included in the term "rubber" are any of the materials already described above.

The high impact polystyrenes of the present invention can be prepared using additives. Exemplary additives include fillers such as chain transfer agents, talc, anti-oxidants, UV stabilizers, lubricants, mineral oil, plasticizers, and the like. Any additive known to be useful in preparing high impact polystyrenes to those of ordinary skill in the art of preparing such polymers can be used with the present invention.

In an embodiment of the present invention wherein there is residual monomer at the end of the polymerization of the styrene monomer, the monomer can be removed from the high impact polystyrene. In embodiments where a solvent is used, the solvent can be removed from the high impact polystyrene. Any method of removing unreacted styrene monomer and solvent, if any, known to be useful can to those of ordinary skill in the art of manufacturing high impact polystyrene can be used with the method of the present invention. After removal, the solvent and styrene monomer can be recycled or discarded.

The high impact polystyrene of the present invention can have desirable morphology. In one embodiment, the high impact polystyrene of the present invention has a continuous polystyrene phase including a non-continuous phase composed of honeycomb structures. The honeycomb structures, consisting of polystyrene inclusions within a rubber matrix, preferably have a diameter of from about 1 to about 12000 nanometers. A substantial number of the honeycomb structures will also include from about 4 to about six inclusions of polystyrene. Such a morphology is optimum for producing impact polystyrene with good physical properties.

It is well known in the art of preparing HIPS that optimum particle size and particle morphology is obtained by balancing such factors as bulk viscosity, chemical grafting, rubber and polystyrene molecular weights, and the shear rates utilized. It is generally considered desirable to formulate toward a narrow particle size distribution and large, regular inclusions in order to obtain the highest rubber phase volume.

The following examples show the effect of grafting and non-grafting initiators in the presence and absence of n-dodecyl mercaptan (NDM), which is a chain transfer agent. As the level of grafting decreases, polystyrene inclusions can decrease in size and the overall number of particles per unit volume can increase, if the shear rate is maintained constant. Using a grafting initiator in a HIPS formulation prepared at the same shear rate as an otherwise similar formulation without the grafting initiator can cause particle disintegration, which in turn can cause particle size distribution broadening. This is generally considered undesirable.

In the Examples, as the level of AIBN is increased, the rubber particle size increases slightly and the morphology is maintained, however, some of the inclusions can appear smaller. Rubber particle size increases in the presence of NDM, as expected, some of the honeycomb morphology is preserved. As the level of NDM is increased, the rubber membrane of the inclusions can often collapse and irregular inclusions are formed. This also is generally considered undesirable.

EXAMPLES

The following examples are provided to illustrate the present invention. The examples are not intended to limit the scope of the present invention and they should not be so interpreted. Amounts are in weight parts or weight percentages unless otherwise indicated.

Example 1

A high impact polystyrene is prepared using a lab scale continuous stirred reactor (CSTR). The CSTR used for this example has three reactors. In FIG. 1, a schematic view of an elongated upflow reactor is shown. The first reactor of the CSTR, R1, is a glass vessel having a 4:1 height to diameter ratio, and is similar to the reactor (100) shown in FIG. 1. That this reactor is an upflow reactor is shown by the fact that the feed of reactants enter the reactor (100) via the inlet (102). The reactants pass through the reactor and exit as an effluent via an outlet (103). During the residence of the reactants, the reactants are admixed using a multiblade agitator (101).

Figure 2:
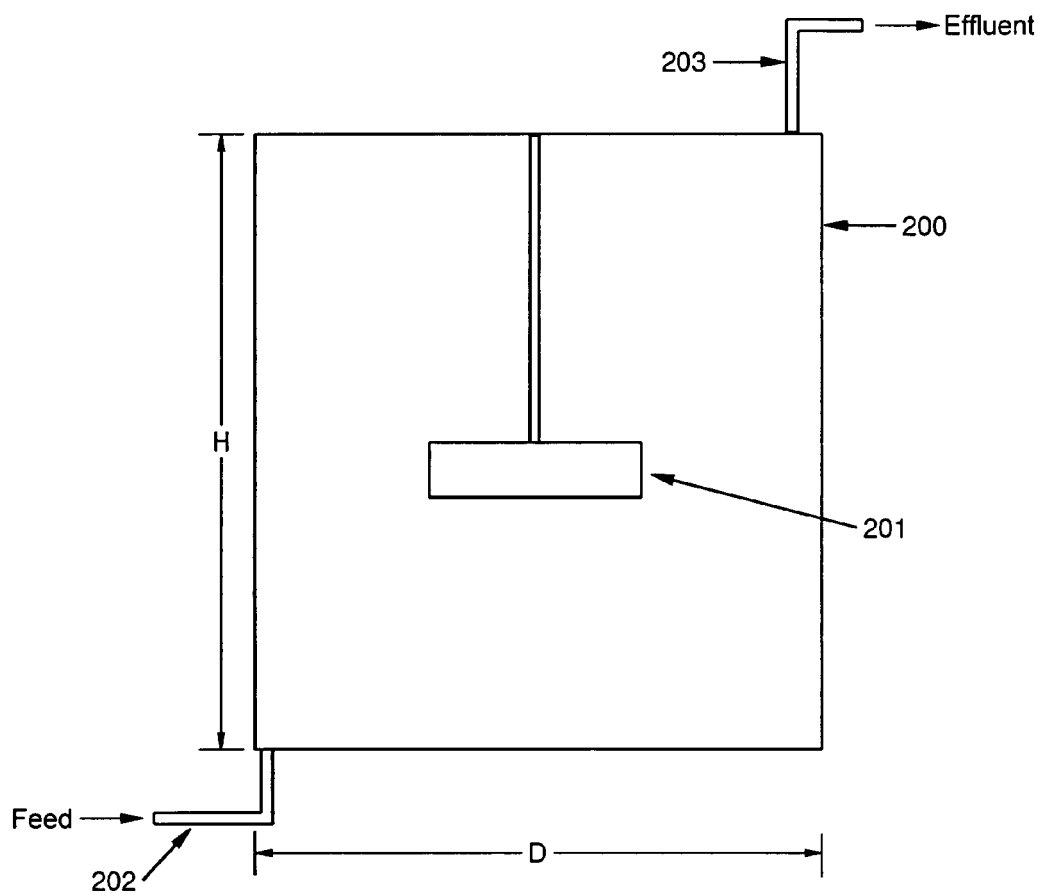
FIG. 2. is a schematic view of a proportional upflow reactor

The second reactor of the CSTR, R2, is a stainless steel vessel having a 1.2:1 height to diameter ratio. In FIG. 2, a schematic view of a proportional upflow reactor is shown. R2 is similar to the reactor (200) shown in FIG. 2. That this reactor is also an upflow reactor is shown by the fact that the feed of reactants enter the reactor (200) via the inlet (202). The reactants pass through the reactor and exit as an effluent via an outlet (203). During the residence of the reactants, the reacts are admixed using single blade agitator (201).

The third reactor, R3, is a glass vessel having a 3.4:1 height to diameter ratio, similar to R1. R1 and R3 are electrically heated. R2 is a jacketed vessel using hot oil as a heat source. The CSTR components and the procedures for controlling it during the production of high impact polystyrene are substantially similar to the disclosures of United States Patent Application Publication No. 2002/0173588 A1, the content of which is hereby incorporated by reference.

Figure 3:
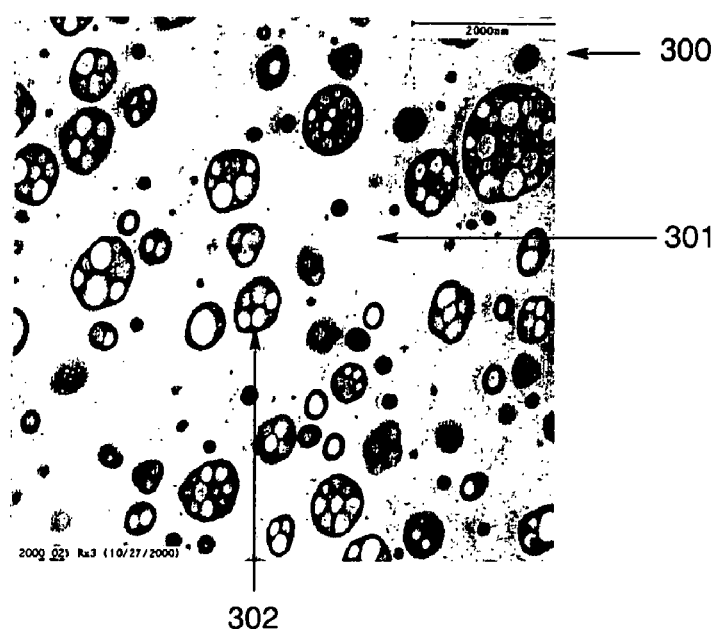
FIG. 3 is a photomicrograph made using transmission electron microscopy (TEM) techniques of a high impact polystyrene of the present invention described below as Example 1.

An admixture of 96 parts styrene monomer and 4 parts Bayer 550 polybutadiene rubber; a product of Bayer Corporation, Orange, Tex., are admixed with 100 ppm 2,2'-azoisobutyronitrile (AIBN) and 300 ppm Lupersol 531 and fed through the CSTR described above under the conditions set forth in the Table. A high impact polystyrene sample is prepared and subjected to TEM techniques to prepare a photomicrograph (300) that is displayed as FIG. 3. In the photomicrograph, it can be seen that the continuous polystyrene phase (301), includes many honeycomb structures (302) having a diameter of about 1000 nanometers. Within the honeycomb structures (302), there are predominantly 4 to 6 inclusions of polystyrene. This is an optimum morphology for preparing high impact polystyrenes having good physical properties.

Example 2

Figure 4:
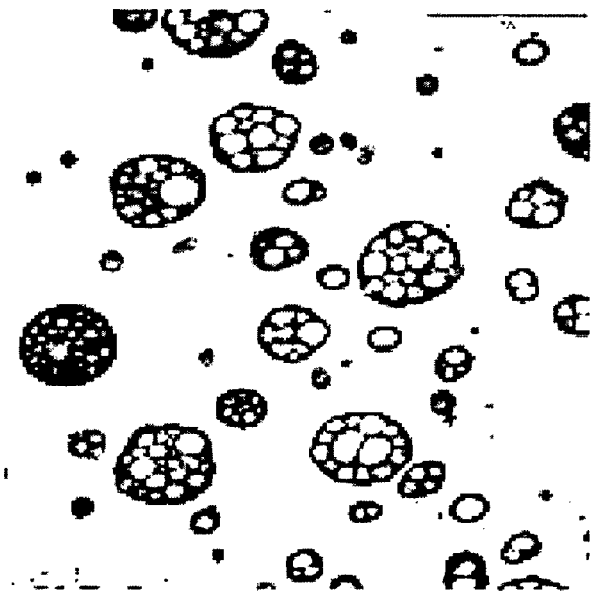
FIG. 4 is a photomicrograph made using TEM techniques of a high impact polystyrene of the present invention described below as Example 2.

A high impact polystyrene is prepared substantially identically to Example 1 except that the conditions disclosed in the Table are used and 200 parts per million of AIBN are used instead of 100 ppm. A TEM micrograph is prepared and displayed as FIG. 4. Note that the desirable properties of Example 1 are also visible in this photomicrograph.

Example 3

Figure 5:
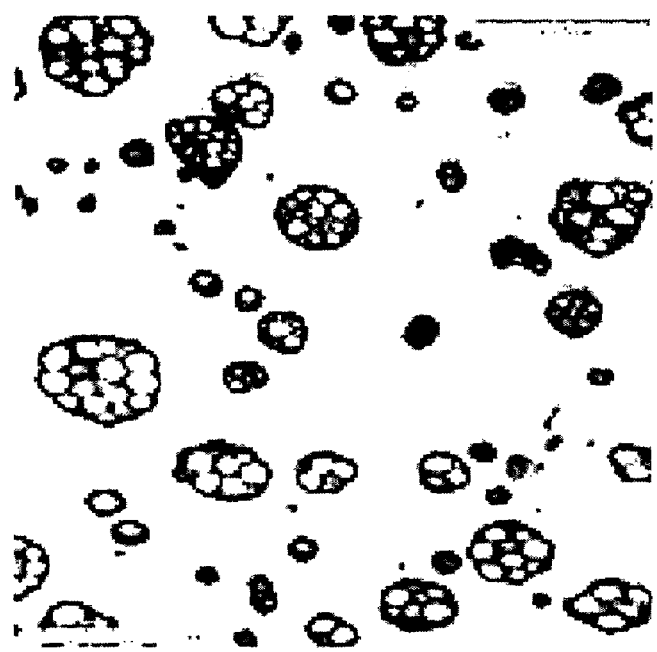
FIG. 5 is a photomicrograph made using TEM techniques of a high impact polystyrene of the present invention described below as Example 3.

A high impact polystyrene is prepared substantially identically to Example 1 except that the conditions disclosed in the Table are used and 300 parts per million of AIBN are used instead of 100 ppm. A TEM micrograph is prepared and displayed as FIG. 5. Note that the desirable properties of Example 1 are also visible in this photomicrograph.

Example 4

Figure 6:
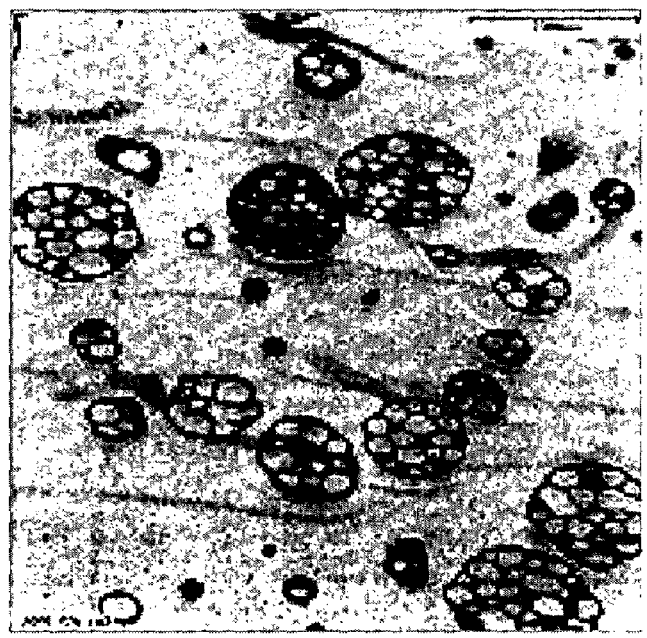
FIG. 6 is a photomicrograph made using TEM techniques of a high impact polystyrene of the present invention described below as Example 4.

A high impact polystyrene is prepared substantially identically to Example except that the conditions disclosed in the Table are used and 300 parts per million of AIBN are used instead of 100 ppm and an additional 200 parts per million of n-dodecyl mercaptan are used. A TEM micrograph is prepared and displayed as FIG. 6. Note that the desirable properties of Example 1 are also visible in this photomicrograph.

Example 5

Figure 7:
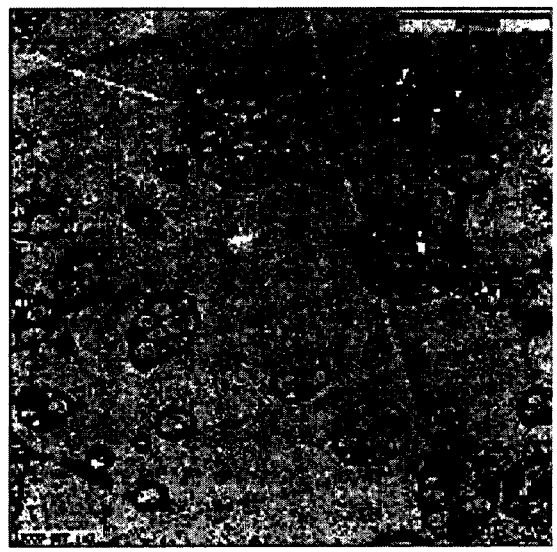
FIG. 7 is a photomicrograph made using TEM techniques of a high impact polystyrene of the present invention described below as Example 5.

A high impact polystyrene is prepared substantially identically to Example 1 except that the conditions disclosed in the Table are used and 300 parts per million of AIBN are used instead of 100 ppm and an additional 300 parts per million of n-dodecyl mercaptan are used. A TEM micrograph is prepared and displayed as FIG. 7. Note that the desirable properties of Example 1 are also visible in this photomicrograph.

Comparative Example I

Figure 8:
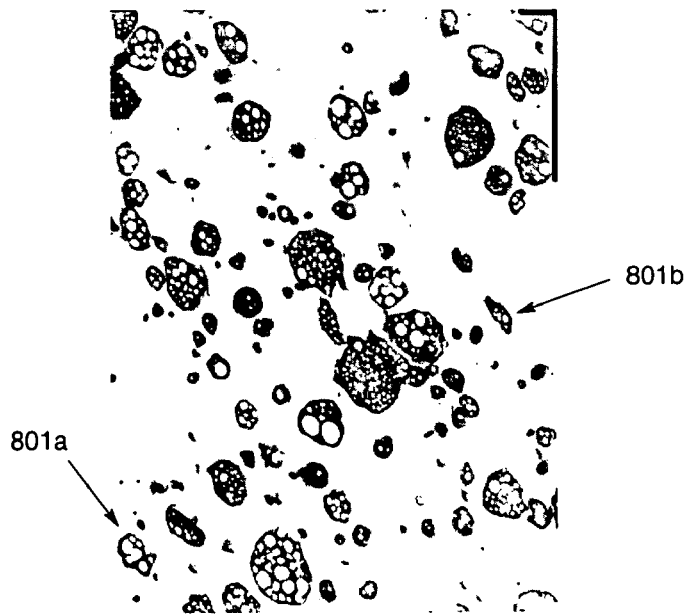
FIG. 8 is a photomicrograph made using TEM techniques of a high impact polystyrene described below as Comparative Example I.

A high impact polystyrene is prepared substantially identically to Example 1 except that the conditions disclosed in the Table are used and a two reactor apparatus is used. The formulation consists of 97 parts of styrene and 3 parts of Bayer 550 rubber. Also included in the formulation is 200 parts per million of t-amyl-2-ethylhexylmonoperoxycarbonate, agrating initiator. A TEM micrograph is prepared and displayed as FIG. 8. Note that some of the rubber particles have lost structural integrity (801a-b).

Comparative Example II

Figure 9:
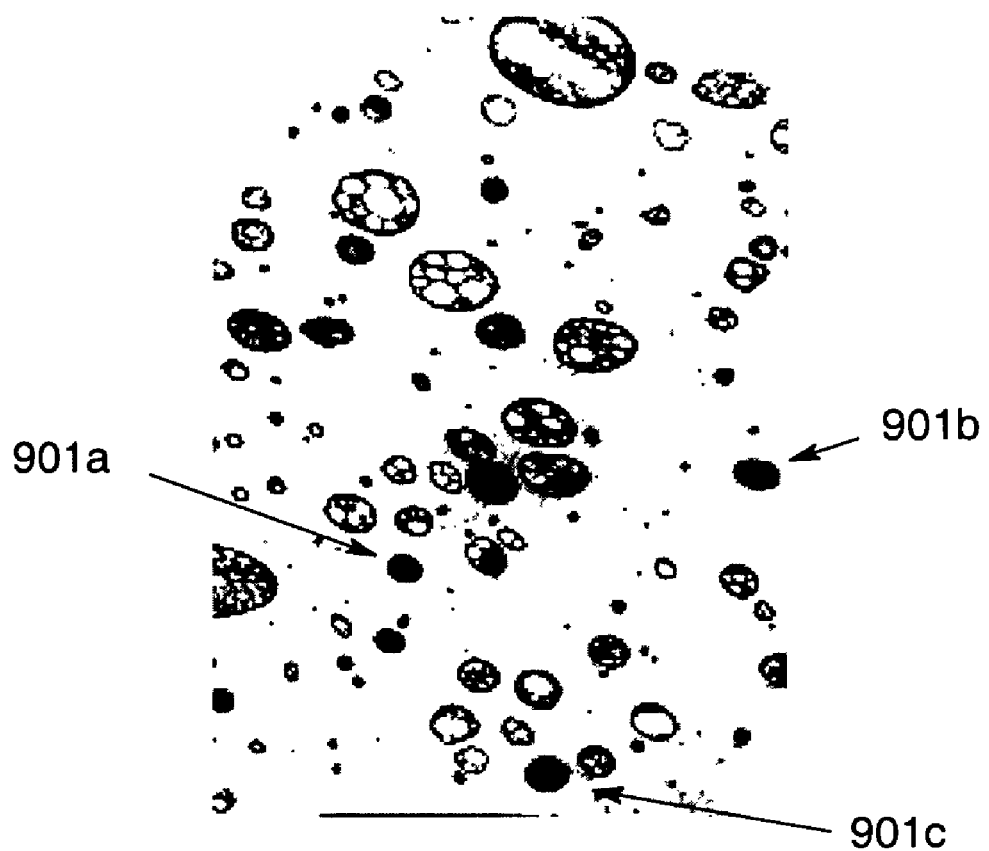
FIG. 9 is a photomicrograph made using TEM techniques of a high impact polystyrene described below as Comparative Example II.

A high impact polystyrene is prepare by admixing 3 parts of Bayer 550 rubber and 97 parts of styrene and doing a thermal polymerization. A TEM micrograph is prepared and displayed as FIG. 9. Note that some of the rubber particles have no inclusions (901a-c).

TABLE

| | Reactor Conditions Steady State Conditions | | | | | | | | |
| --- | --- | --- | --- | --- | --- | --- | --- | --- | --- |
| | Reactor 1 | | | Reactor 2 | | | Reactor 3 | | |
| Formulations | Temp °C. | Retention Time minutes | % Solids | Temp °C. | Retention Time minutes | % Solids | Temp °C. | Retention Time minutes | % Solids |
| Example 1 4% Bayer 550 100 ppm AIBN/300 PPM L-331 | 110 | 42 | 9 | 125 | 103 | 24 | 126 | 75 | 37 |

TABLE-continued

| | Reactor Conditions Steady State Conditions | | | | | | | | |
|---|---|---|---|---|---|---|---|---|---|
| | Reactor 1 | | | Reactor 2 | | | Reactor 3 | | |
| Formulations | Temp °C. | Retention Time minutes | % Solids | Temp °C. | Retention Time minutes | % Solids | Temp °C. | Retention Time minutes | % Solids |
| Example 2 4% Bayer 550 200 ppm AIBN/300 PPM L-331 | 107 | 45 | 14 | 122 | 112 | 31 | 126 | 82 | 50 |
| Example 3 4% Bayer 550 300 ppm AIBN/300 PPM L-331 | 109 | 45 | 14 | 116 | 112 | 33 | 131 | 82 | 48 |
| Example 4 4% Bayer 550 300 ppm AIBN/300 PPM L-331 200 NDM | 106 | 36 | 13 | 113 | 88 | 30 | 128 | 65 | 58 |
| Example 5 4% Bayer 550 300 ppm AIBN/300 PPM L-331 300 NDM | 105 | 41 | 12 | 115 | 100 | 31 | 128 | 73 | 64 |
| Comparative Example I 3% Bayer 550 200 PPM TAEC | 114 | 67 | 10 | 115 | 92 | 22 | — | — | — |
| Comparative Example II 3% Bayer 550 | 137 | 72 | 20 | 137 | 98 | 48 | — | — | — |

Bayer 550 is a linear polybutadiene
TAEC is t-Amyl-2-ethylhexylmonoperoxycarbonate
AIBN is Azobis(isobutyro)nitrile
L-331 Lupersol is 331 1,1-di(t-butylperoxy)cyclohexane
NDM is n-dodecyl mercaptan

What is claimed is:

1. A process for preparing a high impact polystyrene comprising admixing a rubber and styrene monomer in the presence of at least two polymerization initiators and polymerizing the styrene wherein at least one of the at least two polymerization initiators is a grafting initiator and at least one of the at least two polymerization initiators is a non-grafting initiator, and wherein the temperature range for the polymerization is from about 100° C. to about 230° C.

2. The process of claim 1 additionally comprising polymerizing the styrene monomer in the presence of a chain transfer agent.

3. The process of claim 1 wherein rubber is selected from the group consisting of polybutadiene, styrene-butadiene rubber, styrene-butadiene-styrene rubber, natural rubber, and mixtures thereof.

4. The process of claim 3 wherein the rubber is polybutadiene.

5. The process of claim 1 additionally comprising including a solvent in the admixture.

6. The process of claim 5 wherein the solvent is selected from the group consisting of ethylbenzene, toluene, xylenes, cyclohexane, and mixtures thereof.

7. The process of claim 5 wherein the solvent is an aliphatic hydrocarbon solvent.

8. The process of claim 1 wherein the grafting initiator is selected from the group consisting of 1,1-di-(t-butylperoxy) cyclohexane; 1,1-di-(t-amylperoxy) cyclohexane); 1,1-di-(t-butylperoxy)-3,3,5-trimethyl-cyclohexane; OO-t-amyl-O-(2-ethylhexyl) monoperoxy-carbonate); OO-t-butyl O-isopropyl monoperoxy-carbonate; OO-t-butyl-O-(2-ethylhexyl)monoperoxy-carbonate; butyl-4,4-di(t-butylperoxy) valerate; Ethyl 3,3-Di-(t-butylperoxy)butyrate; and mixtures thereof.

9. The process of claim 8 wherein the grafting initiator is 1,1-di-(t-butylperoxy) cyclohexane.

10. The process of claim 1 wherein the high impact polystyrene is prepared using an upflow reactor.

11. The process of claim 10 wherein the process is a continuous process.

12. The process of claim 1 wherein the temperatures range for the polymerization is from about 110° C. to about 180° C.

13. The process of claim 1 wherein the grafting initiator is present in an amount of from about 50 to about 1000 parts per million and the non-grafting initiator is present in an amount of from about 100 to about 600 parts per million.

14. The process of claim 13 wherein the grafting initiator is present in an amount of from about 100 to about 600 parts per million and the non-grafting initiator is present in an amount of from about 100 to about 500 parts per million.

15. The process of claim 1 wherein the grafting and non-grafting initiators are present in a ratio of grafting to non-grafting initiator of from about 1:10 to about 10:1.

16. The process of claim 15 wherein the ratio of grafting to non-grafting initiator is from about 1:3 to about 3:1.

17. The process of claim 16 wherein the weight ratio of styrene to rubber is from about 99:1 to about 7:1.

18. The process of claim 1 wherein the admixture includes an additive.

19. The process of claim 18 wherein the additive is selected from the group consisting of chain transfer agents, talc, antioxidants, UV stabilizers, lubricants, mineral oil, plasticizers.

20. The process of claim 1 additionally comprising removing residual monomer or solvent from the product high impact polystyrene, 21. A high impact polystyrene prepared by the process of claim 1.

* * * * *